United States Patent
van Lieshout et al.

(10) Patent No.: US 9,013,453 B2
(45) Date of Patent: Apr. 21, 2015

(54) ELECTRONIC DEVICE WITH A TOUCH SENSITIVE PANEL, METHOD FOR OPERATING THE ELECTRONIC DEVICE, AND DISPLAY SYSTEM

(75) Inventors: Petrus Johannes Gerardus van Lieshout, Eindhoven (NL); Bart Peeters, Eindhoven (NL); Cornelis Jan Hendrik de Zeeuw, Eindhoven (NL); Robert Sjang Josine van Dijk, Eindhoven (NL); Hjalmar Edzer Ayco Huitema, Eindhoven (NL)

(73) Assignee: Creator Technology B.V., Breda (NL)

( * ) Notice: Subject to any disclaimer, the term of this patent is extended or adjusted under 35 U.S.C. 154(b) by 74 days.

(21) Appl. No.: 13/525,144

(22) Filed: Jun. 15, 2012

(65) Prior Publication Data
US 2013/0113761 A1 May 9, 2013

Related U.S. Application Data

(60) Provisional application No. 61/498,016, filed on Jun. 17, 2001.

(51) Int. Cl.
*G06F 3/041* (2006.01)
*G06F 1/16* (2006.01)

(52) U.S. Cl.
CPC .............. *G06F 3/041* (2013.01); *G06F 1/1643* (2013.01); *G06F 1/1684* (2013.01); *G06F 3/0418* (2013.01)

(58) Field of Classification Search
CPC ..... G06F 1/1643; G06F 1/1684; G06F 3/041; G06F 3/0418
USPC ........... 345/173, 98, 175, 176, 177, 174, 100, 345/99, 178
See application file for complete search history.

(56) References Cited

U.S. PATENT DOCUMENTS

| | | | | |
|---|---|---|---|---|
| 5,283,559 | A * | 2/1994 | Kalendra et al. | 345/168 |
| 5,428,367 | A * | 6/1995 | Mikan | 345/157 |
| 7,626,578 | B2 * | 12/2009 | Wilson et al. | 345/175 |
| 7,639,238 | B2 * | 12/2009 | Hauck | 345/173 |
| 8,502,800 | B1 * | 8/2013 | Vier | 345/174 |
| 2002/0070926 | A1 * | 6/2002 | Kavanagh | 345/173 |
| 2004/0140993 | A1 * | 7/2004 | Geaghan et al. | 345/702 |
| 2004/0183787 | A1 * | 9/2004 | Geaghan et al. | 345/173 |
| 2006/0077622 | A1 * | 4/2006 | Keely et al. | 361/681 |
| 2007/0052690 | A1 * | 3/2007 | Roberts | 345/173 |
| 2008/0309622 | A1 * | 12/2008 | Krah | 345/173 |

(Continued)

FOREIGN PATENT DOCUMENTS

WO  WO 2009/075577 A1  6/2009

*Primary Examiner* — Vijay Shankar
*Assistant Examiner* — Abhishek Sarma

(57) ABSTRACT

An electronic device having a touch sensitive panel has an opened and a closed state, and comprises a sensor circuit, a touch simulation facility and a comparator. The sensor circuit is for generating a touch signal indicative for a position where a touch of the touch sensitive panel is detected. The touch simulation facility is for evoking a touch signal at a position of the touch sensitive panel, and comprises a touch simulation element which in the closed state of the electronic device is arranged opposite the touch sensitive panel. The comparator is for comparing the touch signal with a reference value corresponding to the touch simulation element and for generating a correction signal for adjusting a setting of the sensor circuit for compensation of a difference detected between the position where the touch signal is evoked and the position indicated by the touch signal.

10 Claims, 17 Drawing Sheets

(56) References Cited

U.S. PATENT DOCUMENTS

| | | | |
|---|---|---|---|
| 2009/0089718 A1* | 4/2009 | Pompilio et al. | 715/865 |
| 2009/0160878 A1* | 6/2009 | Kwong et al. | 345/690 |
| 2009/0273584 A1* | 11/2009 | Staton et al. | 345/178 |
| 2010/0095234 A1* | 4/2010 | Lane et al. | 715/773 |
| 2010/0315345 A1* | 12/2010 | Laitinen | 345/173 |
| 2010/0315373 A1* | 12/2010 | Steinhauser et al. | 345/174 |
| 2011/0310041 A1* | 12/2011 | Williams et al. | 345/173 |
| 2012/0162088 A1 | 6/2012 | van Lieshout et al. | |
| 2012/0187956 A1* | 7/2012 | Uzelac et al. | 324/537 |
| 2012/0188197 A1* | 7/2012 | Uzelac et al. | 345/174 |
| 2012/0191394 A1* | 7/2012 | Uzelac et al. | 702/79 |

* cited by examiner

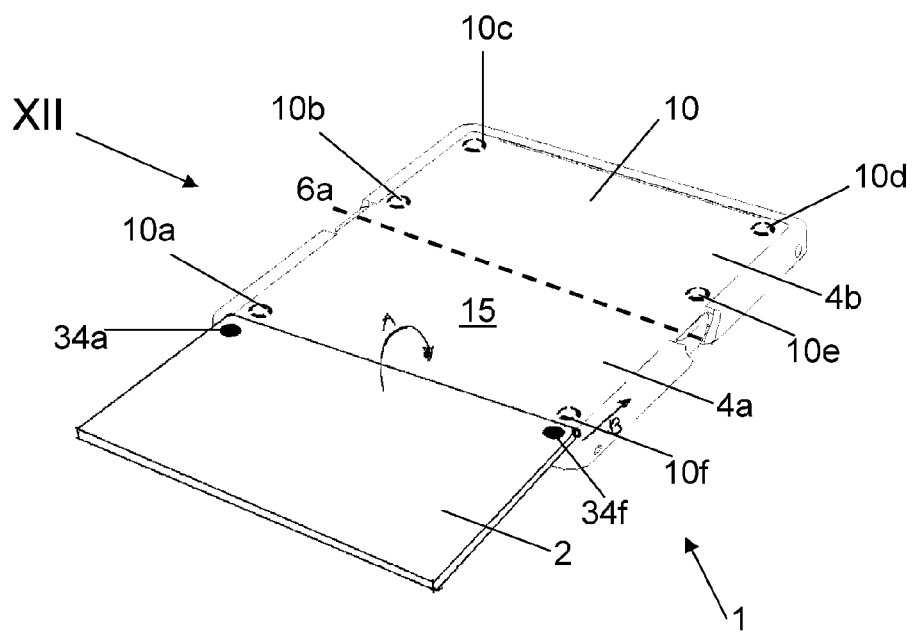
FIG. 12A
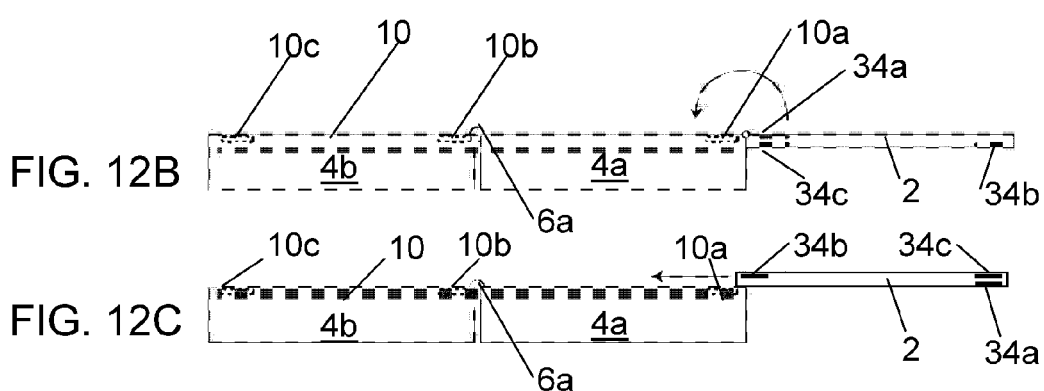
FIG. 12B
FIG. 12C

ELECTRONIC DEVICE WITH A TOUCH SENSITIVE PANEL, METHOD FOR OPERATING THE ELECTRONIC DEVICE, AND DISPLAY SYSTEM

CROSS-REFERENCE TO RELATED APPLICATIONS

This application claims the benefit of U.S. Provisional Application No. 61/498,016, filed on Jun. 17, 2011, the entirety of which is incorporated by reference herein.

BACKGROUND OF THE INVENTION

1. Field of the Invention

The present invention relates to an electronic device with a touch sensitive panel.

The present invention further relates to a method for operating such an electronic device.

The present invention further relates to a display system comprising such an electronic device.

2. Description of the Related Art

Unpatterned touch sensors are touch sensors that provide for a continuous output representative for a touched position. Unpatterned touch sensors, also referred to as touch panels in the sequel, have the advantage that they are cheap and simple and usually only have a small number (e.g. 4) of connections. Examples of such touch panels are a 4-wire capacitive touch screen that uses a single electrode layer, for example on top of a display and a 4-wire resistive touch screen that uses two spaced electrode layers. For accurate touch location sensing, calibration of such touch panels is needed. This can be done by having the user touch the touch panel at known locations in a calibration procedure. U.S. Pat. No. 5,283,559 discloses an automated calibration method. According to this patent switchable touch event generators are "cemented or embedded to the surface of a touch-sensitive panel" at known locations.

BRIEF SUMMARY OF THE INVENTION

It is a purpose of the invention to provide an electronic device having a touch sensitive panel and a method for operating such an electronic device allowing for automatic calibration, while obviating the necessity of touch event generators cemented or embedded in the display panel.

In accordance with a first aspect of the invention, an electronic device having a touch sensitive panel is provided, said electronic device being capable of being arranged by a user in one of at least an opened and a closed state. The electronic device may additionally be capable of assuming an intermediary state. The electronic device has a sensor circuit for generating a touch signal indicative for a position where a touch of the touch sensitive panel is detected. The electronic device further has a touch simulation facility for evoking a touch signal at at least one position of said touch sensitive panel. The touch simulation facility comprises at least one touch simulation element which in a closed state of the electronic device is arranged opposite said touch sensitive panel.

In this way, auto-calibration is possible without necessitating additional elements in the touch sensitive panel.

The electronic device may have two or more parts that are arranged movably with respect to each other, and a selection between the opened and the closed state of the electronic device may be made by arranging these parts in a first relative (closed) position, or in a second relative (opened) position.

Alternatively, the electronic device may be formed of a single, flexible part that can for example be rolled into a predetermined compact form.

Touch simulation elements simulate the effect of touching the touch sensitive panel. Touch simulation elements may for example exert a physical pressure on the touch sensitive panel similar in the way a stylus or a finger touches the touch sensitive panel. This may be realized by a protrusion on the electronic device that mechanically contacts the touch sensitive panel once the electronic device is in its closed state. Alternatively, the touch simulation elements may comprise an actuator that mechanically simulates a touch event in the closed state, or an electrically conducting element that electrically simulates a touch event in the closed state.

Various options are available to provide for potentially different states of the touch sensitive panel. In an embodiment, the touch sensitive panel is rollable. In another embodiment, the touch sensitive panel is wrappable. In another embodiment, the electronic device has a first and a second part that are mutually connected via a hinge, and wherein at least one of the first and the second part is provided with said at least one touch sensitive panel and at least the other one of the first and the second part is provide with said at least one touch simulation element.

In the latter embodiment, the second part may comprise sub-parts that are connected to each other via a hinge and wherein in a closed state of the electronic device the first part is arranged between said sub-parts.

In a multi-part electronic device, the part comprising the at least one touch simulation element and the part comprising the at least one touch sensitive panel may be movably coupled to each other by a hinge. Alternatively, the parts may be slidably coupled to each other.

The part comprising the at least one touch simulation element may be provided with a keyboard.

In an embodiment, the touch simulation facility is additionally arranged to detect whether the electronic device is in the opened or the closed state. This functionality may be used to control a low-power mode of the electronic device if it is detected that it is in its closed state or to switch to another display that is visible in the closed state.

In an embodiment, the electronic device further comprises a dexterity compensation unit, for compensating a deviation in an indicated position dependent on a dexterity of the user.

According to a second aspect of the invention, a display system is provided that comprises an electronic device according to the first aspect and additionally comprises at least one display panel.

In an embodiment of the display system, the touch sensitive panel is integrated with the display panel.

In an embodiment of this embodiment of the display system, arrangeable during use in one of a plurality of states, the touch simulation facility comprises a state estimation facility for detecting said arranged one of the states. In that embodiment, the touch simulation facility is arranged for providing a status signal that is indicative of said detected state and the display system comprises a display driver that drives the display according to the detected state.

According to a third aspect of the invention a method is provided for calibrating a touch sensitive panel of an electronic device with a sensor circuit for generating a touch signal indicative for a position where a touch of the touch sensitive panel is detected, the electronic device being arrangeable during use in one of at least a closed and an opened state. The method comprises the steps of arranging the electronic device in its closed state, evoking a touch signal at at least one position of said touch sensitive panel by a touch simulation facility that comprises at least one touch simulation element, which in the closed state of the electronic device is arranged opposite said touch sensitive panel.

The method according to the third aspect is particularly applicable to an electronic device wherein the touch sensitive panel is integrated in a display panel.

BRIEF DESCRIPTION OF THE DRAWINGS

These and other aspects are described in more detail with reference to the drawing. Therein:

FIG. 8A shows a perspective view, FIG. 8B shows a top-view and FIG. 8C shows a cross section according to VIIIC-VIIIC in FIG. 8B;

FIG. 10A shows a top-view and FIG. 10B shows a cross section according to XB-XB in FIG. 10A;

FIG. 12A, 12B, 12C show further embodiments of electronic devices according to the first aspect;

FIG. 13A shows the electronic device in an opened state.

FIG. 13E shows a top-view of the touch sensitive panel, FIG. 13F shows a cross-section according to F-F in FIG. 13E in an opened (stretched) state of the touch sensitive panel and FIG. 13G shows the touch-sensitive panel in a closed state;

DETAILED DESCRIPTION OF EMBODIMENTS

In the following detailed description, numerous specific details are set forth in order to provide a thorough understanding of the present invention. However, it will be understood by one skilled in the art that the present invention may be practiced without these specific details. In other instances, well known methods, procedures, and components have not been described in detail so as not to obscure aspects of the present invention.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes and sizes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element or layer is referred to as being "coupled to" another element or layer, it can be directly on, connected or coupled to the other element or layer or intervening elements or layers may be present. In contrast, when an element is referred to as being "connected to" another element or layer, there are no intervening elements or layers present. Like numbers refer to like elements throughout. As used herein, the term "and/or" includes any and all combinations of one or more of the associated listed items.

Figure 1A:
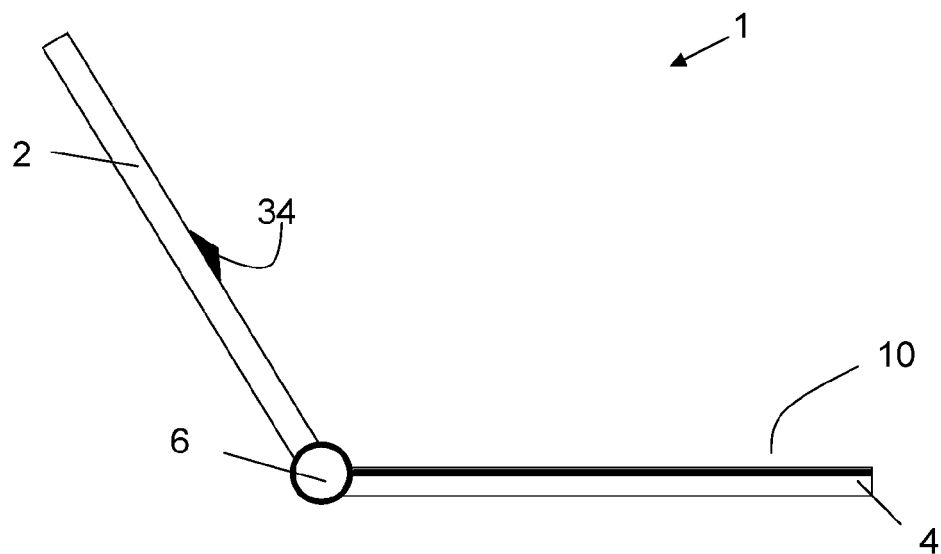
FIG. 1A shows a first embodiment of an electronic device according to the first aspect in an opened state.
Figure 1B:
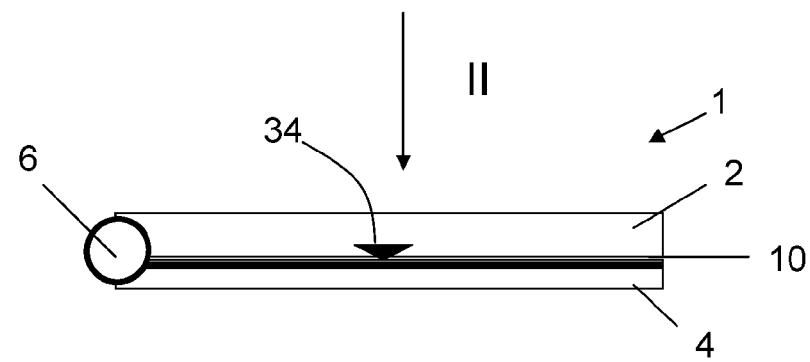
FIG. 1B shows that embodiment in an closed state.

FIG. 1A, 1B schematically shows a first embodiment of an electronic device 1 according to the first aspect of the invention. The electronic device 1 has a first and a second part 2, 4 coupled by hinge 6 of which the second part 4 has a touch sensitive panel 10. Part 2 is provided with a touch simulation element 34. The electronic device 1 has an opened state as shown in FIG. 1A and a closed state, shown in FIG. 1B.

Figure 2:
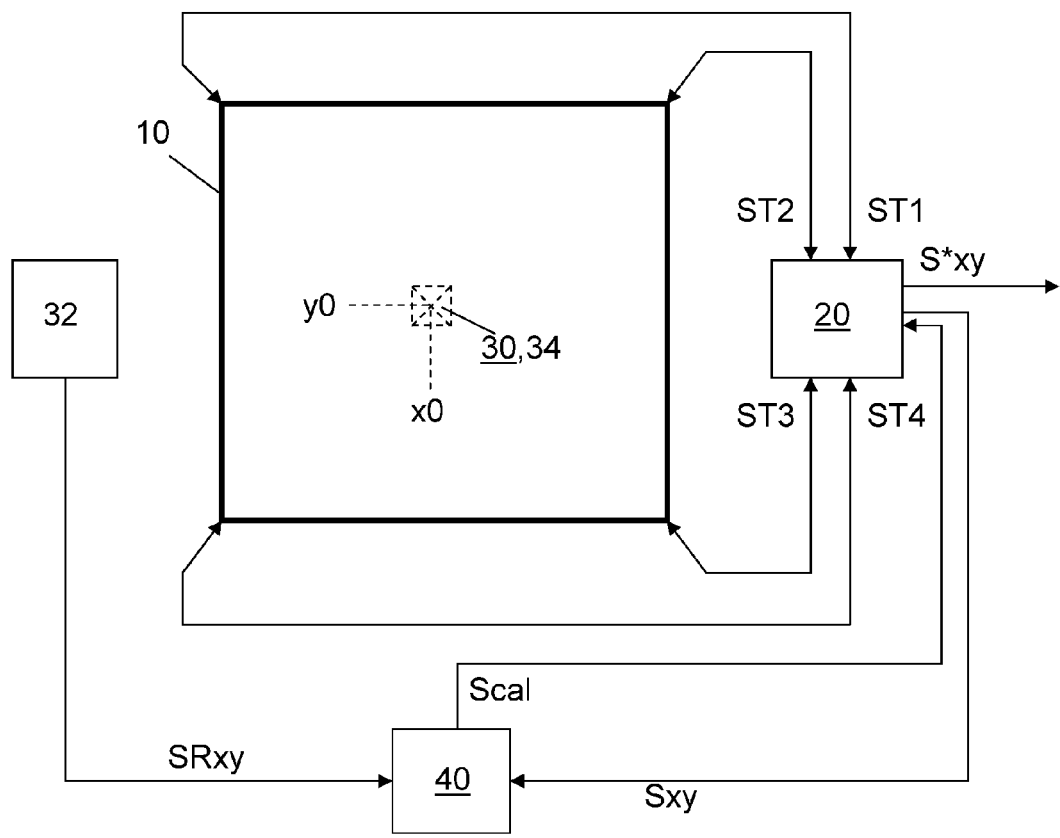
FIG. 2 schematically shows electronic circuitry parts of the electronic device of FIG. 1A, 1B.

FIG. 2 schematically shows a sensor circuit 20 coupled to the touch sensitive panel 10. The sensor circuit 20 is arranged for generating a touch signal Sxy indicative for a position where a touch of the touch sensitive panel 10 is detected, based on one or more signals ST1, ST2, ST3, ST4 from the touch sensitive panel.

Various methods are known as such for generating a touch signal Sxy using a touch sensitive panel 10 using a sensor circuit 20.

The electronic device 1 has a touch simulation facility 30, here formed by a flexible protrusion, e.g. made from rubber as a touch simulation element 34. In a closed state, the touch simulation element 34 is arranged opposite said touch sensitive panel 10. In that state, the touch simulation element 34 mechanically contacts the touch sensitive panel 10 at a position with coordinates (x0, y0), and therewith evokes a touch signal at that position. FIG. 2 shows according to II in FIG. 1B how the touch simulation element 34 is arranged with respect to the touch sensitive panel in the closed state. In this embodiment, the touch simulation element 34 is a passive touch simulation element. A reference value generator 32 generates a reference value SRxy indicative for the real position (x0, y0) of the touch simulation element. The electronic device further comprises a comparator 40 for comparing an uncalibrated output signal Sxy of the sensor circuit 20 with the reference value SRxy and for generating a calibration signal Scal indicative for a difference between the sensed position indicated by the output signal Sxy and the real position of the touch simulation element 34 indicated by the reference signal SRxy. Using the calibration signal the sensor circuit then calculates the calibrated output signal S*xy, as further elaborated later in the description.

Figure 3A:
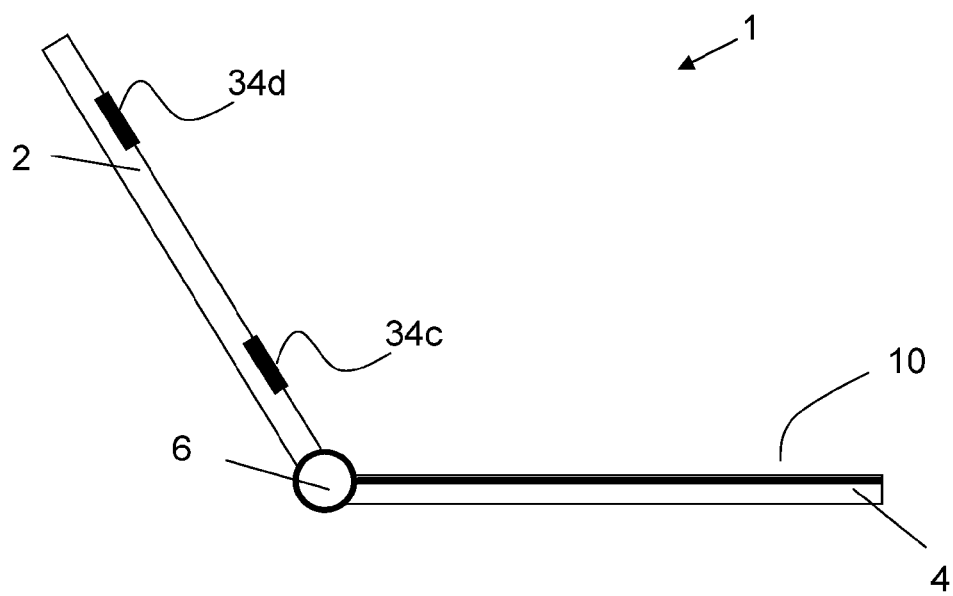
FIG. 3A shows a second embodiment of an electronic device according to the first aspect in an opened state.
Figure 3B:
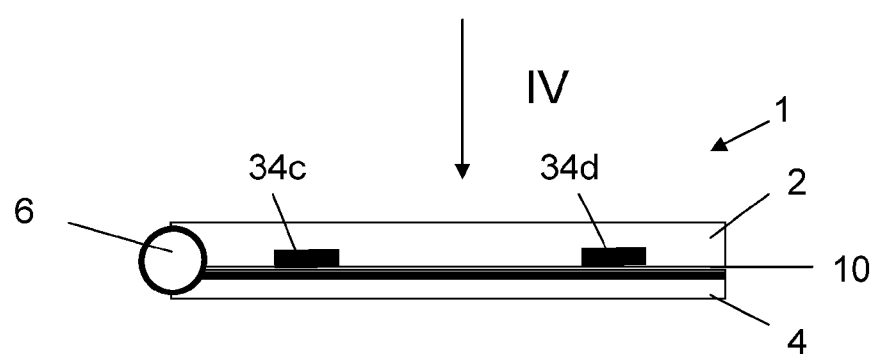
FIG. 3B shows that embodiment in an closed state.
Figure 4:
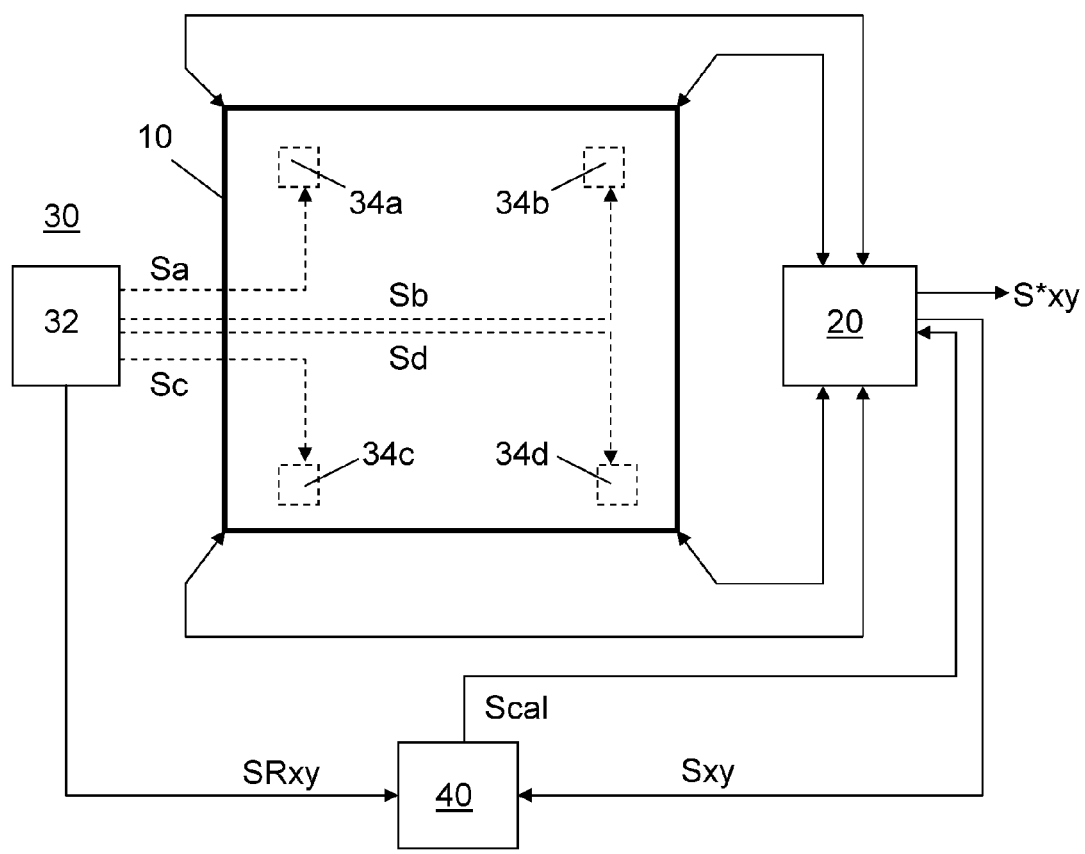
FIG. 4 schematically shows electronic circuitry parts of the electronic device of FIG. 3A, 3B.

FIGS. 3A, 3B and FIG. 4 show a second embodiment of an electronic device 1 according to the first aspect of the invention. Therein FIG. 3A, 3B show the electronic device 1 having the touch sensitive panel 10. The electronic device 1 has an opened state as shown in FIG. 3A and a closed state, shown in FIG. 3B.

FIG. 4 schematically shows the sensor circuit 20 coupled to the touch sensitive panel 10. The second embodiment differs from the first embodiment in that the touch simulation facility 30 comprises a plurality of touch simulation elements 34a, 34b, 34c, 34d. (In FIGS. 3A and 3B, only elements 34c and 34d are shown) In a closed state of the electronic device 1, the touch simulation elements 34a, 34b, 34c, 34d are arranged opposite said touch sensitive panel 10. FIG. 4 shows according to IV in FIG. 3B how the touch simulation elements 34a, 34b, 34c, 34d are arranged with respect to the touch sensitive panel in the closed state. In the embodiment, the touch simulation elements 34a, 34b, 34c, 34d are active touch sensitive elements that are driven by a calibration controller 32 by drive signals Sa, Sb, Sc, Sd. As in the first embodiment the electronic device further comprises a comparator 40 for comparing an uncalibrated output signal Sxy of the sensor circuit 20 with a reference value SRxy corresponding to the at least one touch simulation element. In the closed state of the electronic device, during a calibration phase, the calibration controller 32 independently activates the touch simulation elements 34a, 34b, 34c, 34d and indicates with the reference signal SRxy the position (x,y) of the activated one of the touch simulation elements. It is noted that also more sophisticated touch sensitive panels exist that are capable of simultaneously sensing a plurality of positions. In the case, such a touch sensitive panel is applied, the calibration controller may activate more than one touch simulation element at a time. Likewise, in case such a touch sensitive panel is applied in the first embodiment, the touch simulation facility 30 may comprise more than one passive touch simulation element 34.

Figure 5A:
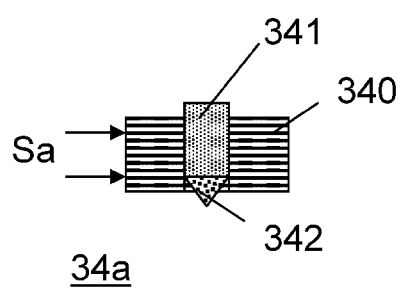
FIG. 5A shows a first example of a touch simulation element.
Figure 5B:
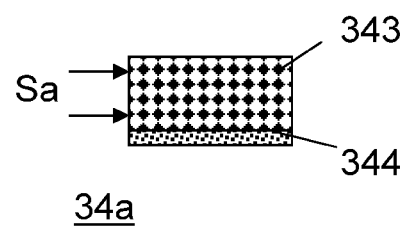
FIG. 5B shows a second example of a touch simulation element.

In the second embodiment, the touch simulation elements 34a, 34b, 34c, 34d may comprise an actuator for mechanically simulating a touch event in the closed state. The actuator converts an electric drive signal Sa, Sb, Sc, Sd into a mechanical force that simulates the touch event. Such an actuator may for example be implemented by a solenoid as shown in FIG. 5A or by a piezo-electric element as shown in FIG. 5B. In the embodiment of FIG. 5A, the touch simulation element 34a comprises a solenoid 340. A core 341 of a magnetisable material such as iron or nickel and provided at an end portion with a tip 342 of rubber or plastic is movably arranged within the solenoid 340. In the embodiment of FIG. 5B, the piezo-electric element 343 is activated by the signal Sa. The piezo-electric element 343 may be provided by a cover 344 for protection of the touch sensitive panel 10. The cover 344 may be integral with a housing of the electronic device 1. It is alternatively possible that a touch is simulated electrically e.g. by applying an electrical or magnetical field at the position of the touch simulation element.

Figure 5C:
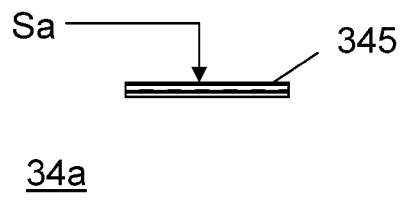
FIG. 5C shows a third example of a touch simulation element.

Most preferable is an embodiment as shown in FIG. 5C wherein the touch simulation element 34a comprises a conductive element 345 facing the touch sensitive panel in the closed state of the electronic device. In that embodiment, the touch simulation element is activated by providing the conductive element with a drive voltage according to the electric drive signal, for example equal to the drive signal. It is not necessary that the conductive element has a very small surface area. It is sufficient that the activation of a touch simulation element results in a reproducible effect on the touch simulation panel. This embodiment is advantageous in that moving parts are avoided.

Although the embodiments of FIG. 5A, 5B, 5C are presented for the touch simulation element 34a, these embodiments are applicable to any of the touch simulation elements. Preferably, the touch simulation elements are mutually identical, but alternatively two or more touch simulation elements may be mutually differently constructed.

Figure 6:
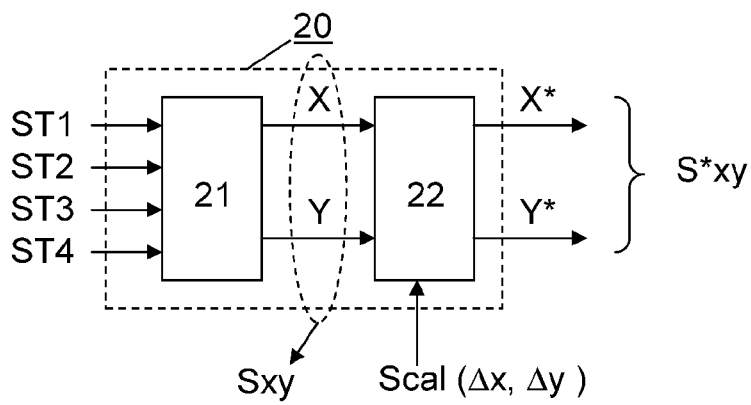
FIG. 6 shows a first example of a sensor circuit.

FIG. 6 shows an embodiment of a sensor circuit 20. The sensor circuit 20 comprises a pre-processing unit 21 and a post-processing unit 22. The pre-processing unit 21 estimates a position X,Y also denoted as uncalibrated output signal Sxy where the touch sensitive panel is touched. The post-processing unit 22 calculates a corrected estimated position X*,Y* from the position X,Y estimated by the pre-processing unit 21 on the basis of the calibration signal Scal.

In the first embodiment of the electronic device described with reference to FIG. 1, 2A, 2B, the calibration signal Scal is calculated on the basis of a single reference position with coordinates (x0, y0). The calibration signal Scal so obtained allows for correction for a drift ($\Delta x$, $\Delta y$) in the measurement of the position.

During a calibration phase, in a closed state of the electronic device the comparator 40 determines the value for the drift as $$\Delta x = X - x0 \text{ and } \Delta y = Y - y0$$

The values $\Delta x$, $\Delta y$ determined in the calibration phase may be stored by the post-processing unit 22 or by the comparator 40, to be used during normal operation of the electronic device for correction of the uncalibrated output signal Sxy as follows:

$$X^* = X - \Delta x \text{ and } Y^* = Y - \Delta y.$$

Figure 7:
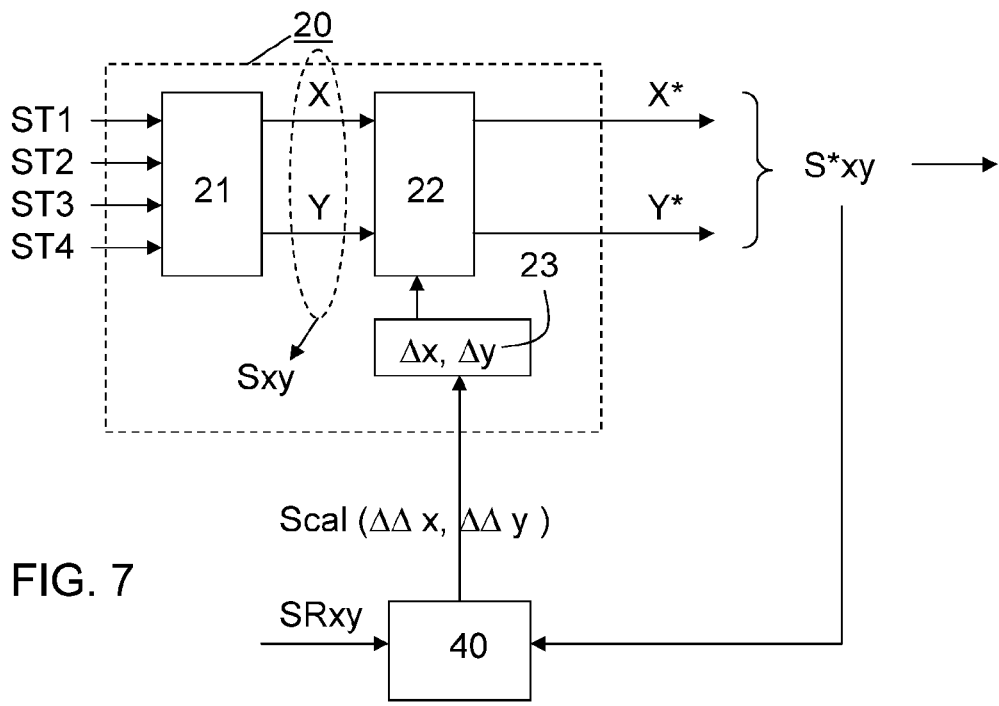
FIG. 7 shows a second example of a sensor circuit.

FIG. 7 illustrates a part of another embodiment. In this case, the comparator 40 compares the reference signal SRxy with the calibrated output signal S*xy. If the signal S*xy is already properly calibrated, the correction values ($\Delta x$, $\Delta y$) stored in a register 23 of the sensor circuit 20 remain the same. If a deviation is found the correction values ($\Delta x$, $\Delta y$) are changed by increments/decrements ($\Delta x$, $\Delta y$) corresponding to the difference between the reference signal SRxy and the calibrated output signal S*xy.

In the case, a calibration is carried out for more than one reference position, more correction options are available. In that case, the post-processing unit 22 may calculate a correction of the estimated position (X,Y) according to the following relationship.

$$\begin{pmatrix} X^* \\ Y^* \end{pmatrix} = \begin{pmatrix} M11 & M12 \\ M21 & M22 \end{pmatrix} \begin{pmatrix} X \\ Y \end{pmatrix} + \begin{pmatrix} \Delta X \\ \Delta Y \end{pmatrix}$$

A calibration on the basis of three reference positions suffices to determine the unknowns M11, M12, M21, M22, ΔX, ΔY in this relationship.

In addition, various options are possible for the preprocessing unit 21 and for the touch sensitive panel 10. Depending on the type of touch sensitive panel, a different pre-processing is used to estimate the position X,Y where the panel is touched. This technology is well-known as such and will therefore not be described in detail in this context. A touch sensitive panel may be integrated with a display panel, for example as disclosed in earlier Application WO2009/075577 and as described in earlier filed patent U.S. application Ser. No. 12/976,590. Both patent applications relate to an integration of a touch sensitive panel into a rollable display. Alternatively, a touch sensitive panel may be applied in a rigid display. Again alternatively, a touch sensitive panel may be used independently. For example, the touch sensitive panel may be provided with visible marks that indicate functions associated with locations on the panel.

Figure 8A:
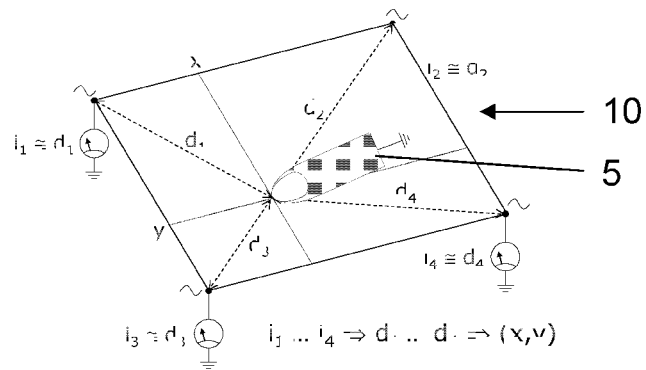
FIG. 8A, 8B, 8C show a first example of a touch sensitive panel, therein
Figure 8B:
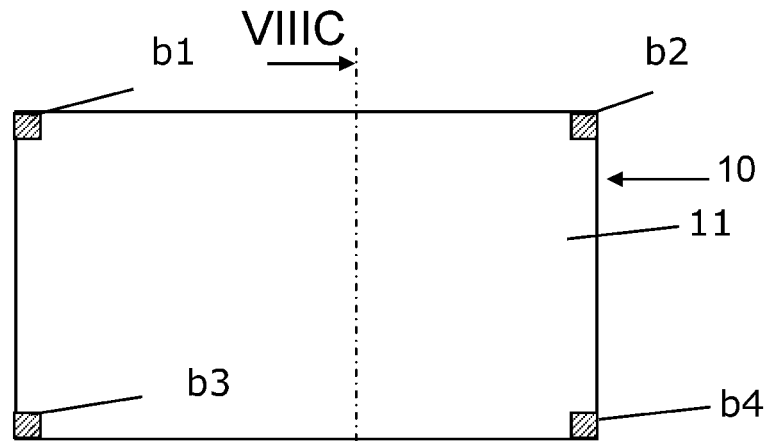
Figure 8C:
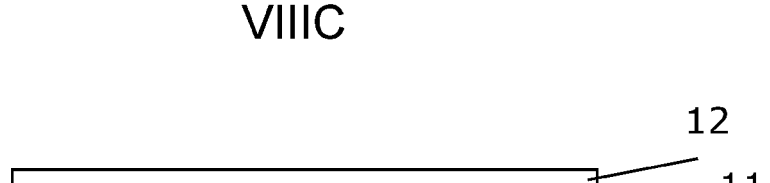

An example of a touch sensitive panel is a capacitive touch sensitive panel as shown in FIGS. 8A to 8C comprising a continuous electrically conductive layer 11 and an insulating layer 12. FIG. 8A shows a capacitive touch sensitive panel 10 according to a perspective view. FIG. 8B shows a top view of the electrically conductive layer 11 and FIG. 8C shows a side-view according to VIIIC-VIIIC in FIG. 8B.

The electrically conductive layer has corner contacts b1, b2, b3, b4 that are connected to respective alternative voltage sources. When a finger 5 or other suitable pointing device touches the touch sensitive panel 10 different currents ST1, ST2, ST3, ST4 will capacitively leak away from said corner contacts b1, b2, b3, b4 depending on the distance from the point (x,y) where the panel is touched to said corner contacts. Accordingly the position (x,y) is estimated by the pre-processing unit 21 from the measured currents by the following relationships:

$x=f(ST1,ST2,ST3,ST4)$ and $y=g(ST1,ST2,ST3,ST4)$

Figure 9:
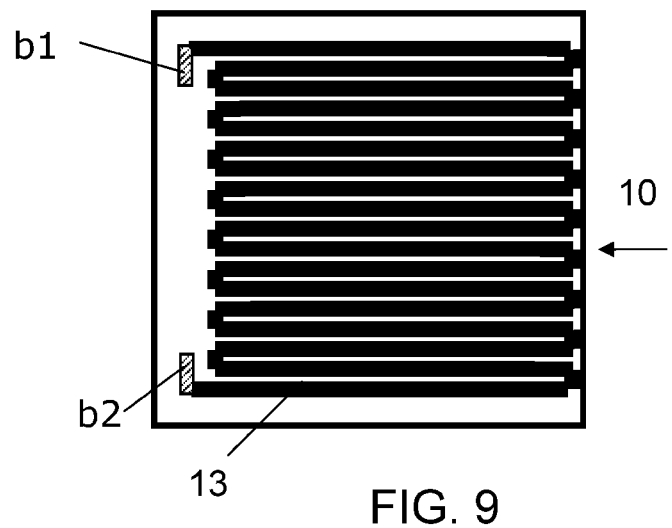
FIG. 9 shows an alternative example of a touch sensitive panel.

FIG. 9 shows another example, wherein the electrically conductive layer of the touch sensitive panel 10 is configured as a meandering pattern 13, having a first and a second end b1, b2. In this case, it holds that $x=f'(ST1,ST2)$, and $y=g'(ST1,ST2)$ Therein ST1, ST2 are the currents measured at the first and the second end b1, b2 of the meandering pattern.

These, usually non-linear, relationships f,g,f',g' may for example be approximated by a polynomial function or by a lookup-table.

Figure 10A:
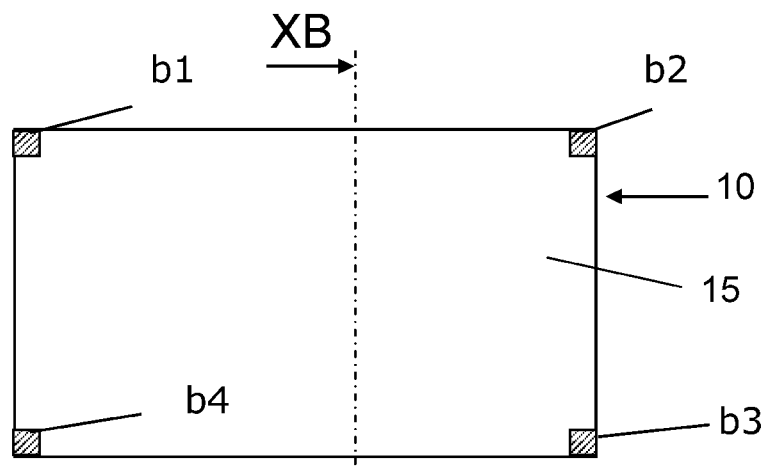
FIG. 10A, 10B show a further example of a touch sensitive panel, therein
Figure 10B:
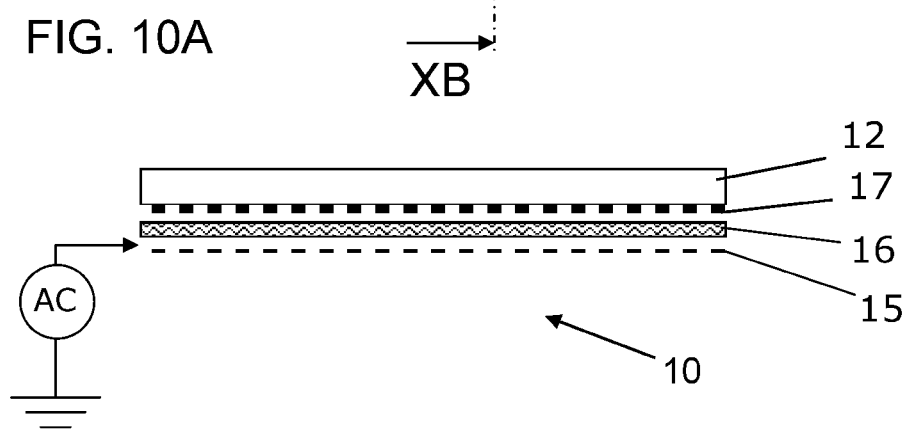

In another embodiment, a resistive touch sensitive panel is used, as schematically shown in FIG. 10A, 10B. FIG. 10A shows a top-view of the resistive touch sensitive panel 10, and FIG. 10B shows a cross-section according to XB-XB in FIG. 10A. As illustrated in FIG. 10B the resistive touch sensitive panel 10 has a first electrically conductive layer 15 having a relatively high conductivity and a second electrically conductive layer 17 having a relatively low conductivity, e.g. a conductivity that is at least 2 to 10 times as low as that of the first electrically conductive layer 15. The panel 10 further has a pressure sensitive layer 16 having conductivity that is locally determined by a local pressure exerted on the pressure sensitive layer. The pressure sensitive layer 16 is sandwiched between the first and the second electrically conductive layer 15, 17. The first electrically conductive layer 15 is coupled to an AC voltage source AC. The second electrically conductive layer 17 has corner contacts b1, b2, b3, b4 that are connected to the pre-processing unit 21 to deliver signals ST1, ST2, ST3, ST4, similar as in the case with a capacitive touch sensitive panel 10 as shown in FIG. 8A-8C.

Figure 11A:
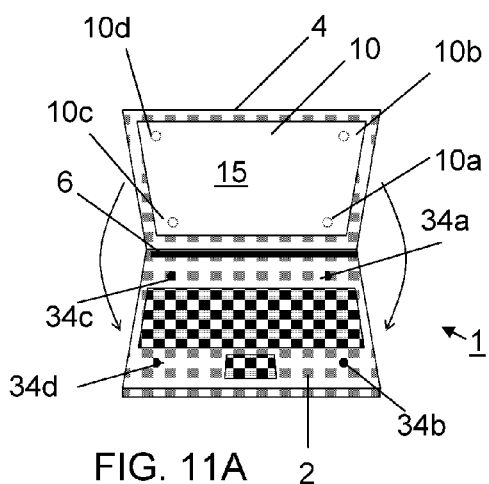
FIG. 11A to 11D show various embodiments of electronic devices according to the first aspect.

By way of example FIGS. 1A and 1B, as well as FIGS. 3A and 3B show an electronic device 1 having a first and a second part 2, 4 that are mutually connected via a hinge 6. In that embodiment, at least one part 4 is provided with touch sensitive panel 10. The other part is provided with one or more touch simulation elements 34, or 34a, . . . , 34d. FIG. 11A shows this configuration in perspective view, for a netbook or notebook computer, wherein the touch sensitive panel 10 is integrated within a display 15. Reference numerals 10a, . . . , 10d show the locations on the touch sensitive panel 10 corresponding to the locations of the touch simulation elements 34a, . . . , 34d.

Figure 11B:
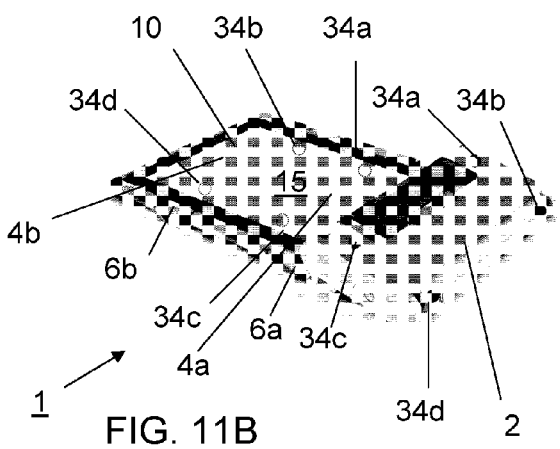

FIG. 11B shows a wrappable configuration of the electronic device 1. The device 1 comprises a main part 2 and further parts hingeably connected thereto. The electronic device 1 has a touch sensitive panel 10, integrated with display 15 that is carried by the further parts 4a and 4b. Part 4a is connected to main part 2 via hinge 6a, and part 4b is connected to part 4a via hinge 6b. Touch simulation elements 34a, . . . , 34d are arranged on the surface of part 2 and in the wrapped, closed state of the electronic device 1 are arranged opposite respective positions 10a, . . . , 10d of the touch sensitive panel 10.

Figure 11C:
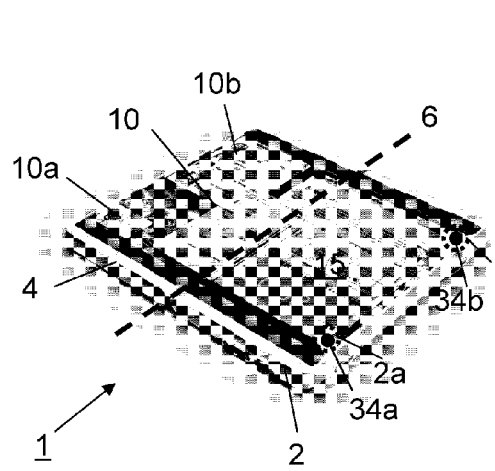

FIG. 11C shows a two part electronic device 1 with hinge 6, wherein the display 15 and the touch sensitive panel 10 integrated therein extends over the full area defined by the parts 2,4. The display 15 with the touch sensitive panel 10 has a first and a second recess 2a, 2b wherein a respective touch simulation element 34a, 34b is arranged. In a closed state of the electronic device 1, the touch simulation elements 34a, 34b are arranged at positions 10a, 10b of the display.

Figure 11D:
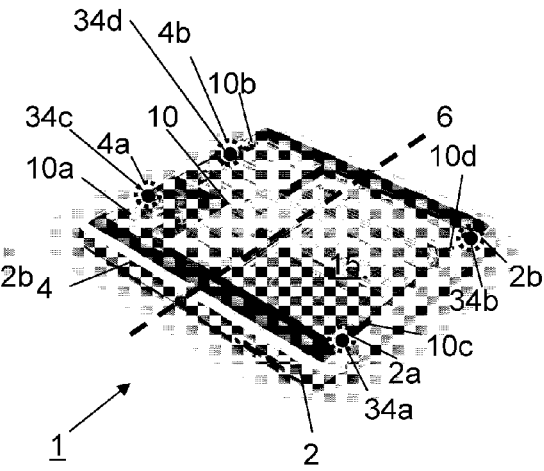

FIG. 11D shows a variant of this embodiment. In this embodiment, the electronic device 1 has two additional touch simulation elements 34c, 34d, that are arranged in recesses 4a, 4b of the touch sensitive panel 10 between the two positions 10a, 10b. If the electronic device 1 is in its closed state these touch simulation elements 34c, 34d counter the touch sensitive panel 10 at positions 10c, 10d.

FIGS. 12A, B and C show another embodiment, wherein the electronic device 1 has a touch sensitive panel 10 integrated into a deformable display 15 carried by parts 4a, 4b that can be folded like a book and wherein an extra cover 2 (e.g. holding a keyboard) can be slid or rotated between the display 15, containing the touch simulation elements.

FIG. 12A shows the electronic device 1 in perspective view. The touch sensitive panel 10 has positions 10a, . . . , 10f where a touch is simulated during a closed state of the electronic device 1. Touch simulation elements are arranged on a keyboard at cover 2. Two of the touch simulation elements 34a, 34f are shown.

FIG. 12B shows a side-view according to XII of one embodiment of the electronic device 1 of FIG. 12A, wherein the extra cover 2 is rotatably coupled to the parts 4a, 4b with the touch sensitive panel 10.

FIG. 12C shows a side-view according to XII of another embodiment of the electronic device 1 of FIG. 12A, wherein the extra cover 2 is slidably coupled to the parts 4a, 4b with the touch sensitive panel 10.

Figures 13A, 13B:
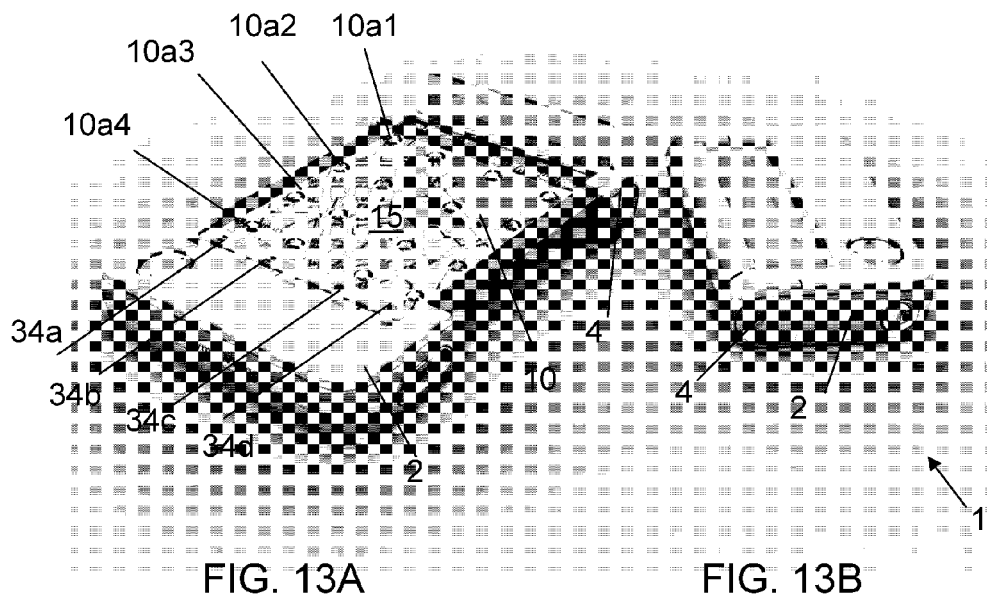
FIGS. 13A, B, C and D show a still further embodiment of an electronic device according to the first aspect, therein
FIG. 13B shows the electronic device in a closed state and FIG. 13C shows circuitry parts of the electronic device.

FIG. 13A, B show an electronic device 1 according to the present invention having a rollable display 15 with integrated touch panel 10. FIG. 13A shows an opened state, wherein the display 15 is fully rolled out and FIG. 13B shows a closed state of the device, wherein the display 15 is stored in a rolled state in the housing 2. The electronic device 1 may have intermediary states, wherein the display 15 is partly unrolled. In the closed state of the device, the touch simulation element 34a is arranged in front of position 10a1 of the touch simulation panel 10 integrated in the display 15. Likewise, the other touch simulation elements 34b, 34c, 34d are arranged opposite corresponding positions in the closed state. This makes it possible to carry out a calibration of the display 10. Using the intermediate states allows for further calibration options. For example, if the display 15 is partly unrolled the touch simulation element 34a is arranged opposite point 10a2 of the touch sensitive panel 10. Likewise, the other touch simulation elements 34b, 34c, 34d are arranged opposite corresponding positions in the intermediary state. This makes it possible to gather independent calibration data. Moreover, this is advantageous in that it allows a calibration of the touch sensitive panel 10 while the panel 10 and the display 15 are in use.

Figure 13C:
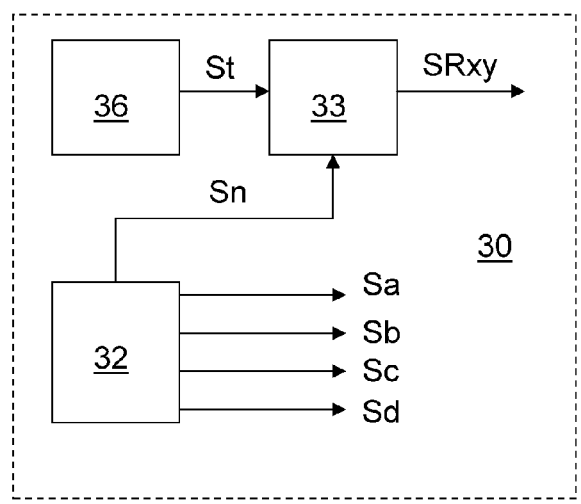

In an embodiment, the electronic device 1 may have a discrete number of intermediate states and a state identification device 36 for determining the present state of the device. In this way, the relevant position of a touch simulation element 34a, 34b, 34c, 34d is known. This is shown in FIG. 13C. Therein the state identification device 36 provides a signal St indicative for the identified state to reference position calculation device 33. The reference position calculation device 33 further receives a touch simulation element selection signal Sn from calibration controller 32 that indicates which of the touch simulation elements 34a, 34b, 34c, 34d is activated. The reference position calculation device 33 calculates the current reference position for which the calibration is carried out. The state identification device 36 may for example determine the present state of the electronic device 1 on the basis of a rotational position of an axis of a roll that carries the rollable display 15. The other electronic devices only having an opened and a closed state, the currently prevailing state may be determined by a switch having a state dependent on a relative position of housing parts of the device, such as a switch arranged on the surface of part 4 that is depressed by part 2 when the electronic device 1 is closed.

Figure 13D:
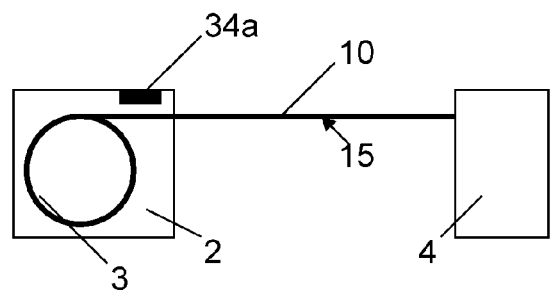
FIG. 13D shows a cross-section of the electronic device in its opened state.

FIG. 13D shows the electronic device according to a cross-section. FIG. 13D shows how the display-panel 15 having integrated therewith the touch sensitive panel 10 is storable on a roll 3 inside part 2 of the device. In the embodiment, the touch simulation element 34a comprises a conductive element that is arranged opposite the surface of the touch sensitive panel 10. Alternatively, the conductive element may be a slide electrode that slides against the surface, or the conductive element may be in the form of a wheel in contact with the surface. A mechanical touch simulation element 34a in the form of a wheel or a slide element in contact with the display panel 10 is also possible.

Figure 13E:
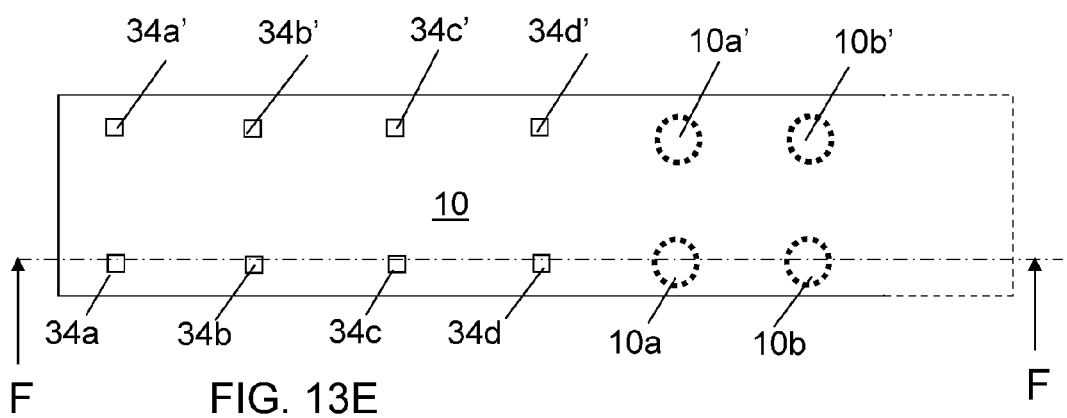
FIG. 13E, 13F, 13G shows a touch sensitive panel in a further embodiment of an electronic device according to the first aspect of the invention, therein
Figure 13F:
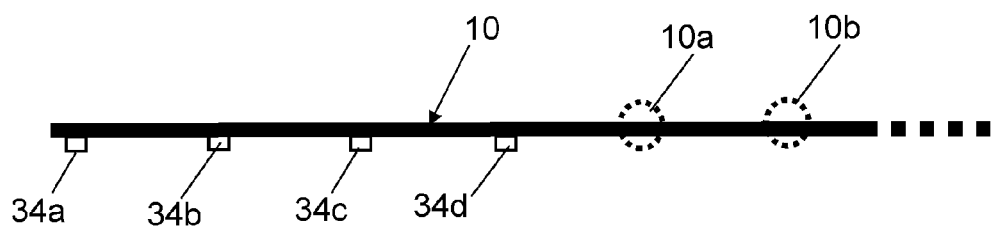
Figure 13G:
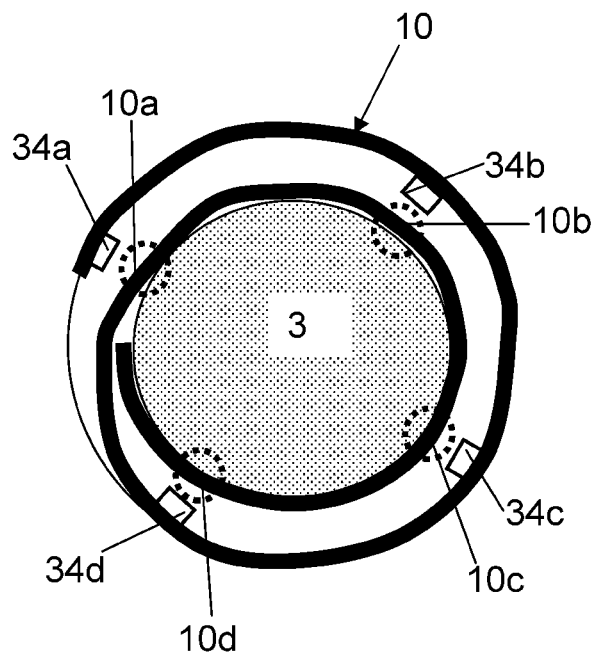

FIG. 13E, 13F, 13G shows a touch sensitive panel 10 in a further embodiment of an electronic device according to the first aspect of the invention. FIG. 13E shows a top-view of the panel. FIG. 13F shows a cross-section according to F-F in FIG. 13E in an opened (stretched) state of the touch sensitive panel 10. FIG. 13G shows the touch-sensitive panel in a closed state, here rolled up onto a spindle 3. In the embodiment, eight touch simulation elements 34a, 34a', 34b, 34b', 34c, 34c', 34d, 34d' are arranged in or on a respective lateral portion in the touch sensitive panel 10. In this case, the touch simulation elements 34a, 34a', 34b, 34b', 34c, 34c', 34d, 34d' are arranged on a side of the touch sensitive panel facing away from a side intended to be touched. For clarity the size of the touch simulation elements 34a, 34a', 34b, 34b', 34c, 34c', 34d, 34d' is exaggerated. In practice, the touch simulation elements may be relatively small, in particular if touch simulation elements are used that capacitively simulate a touch event, e.g. as described with reference to FIG. 5C. In that case, the touch simulation elements may for example be provided in the form of rectangular electrically conductive elements having a size of 1×1 mm and a thickness of a few μm. The touch simulation elements may be integrated within the display panel 10, instead of being arranged at the surface of the panel. In the rolled up state shown in FIG. 13G, the touch simulation elements 34a, 34b, 34c, 34d are arranged opposite another lateral portion 10a, 10b, 10c, 10d of the touch sensitive panel 10. For clarity, the touch simulation elements 34a, . . . are shown at distance from the lateral portions 10a, opposite which they are arranged in the rolled up state in FIG. 13G. In practice, the touch sensitive panel may be more tightly rolled up so that the touch simulation elements 34a, 34b, 34c, 34d closely approach or touch their associated lateral portions 10a, 10b, 10c, 10d respectively of the touch sensitive panel 10.

In a variation of the embodiment shown, the spindle 3 may be provided with further touch sensitive elements.

Figure 14:
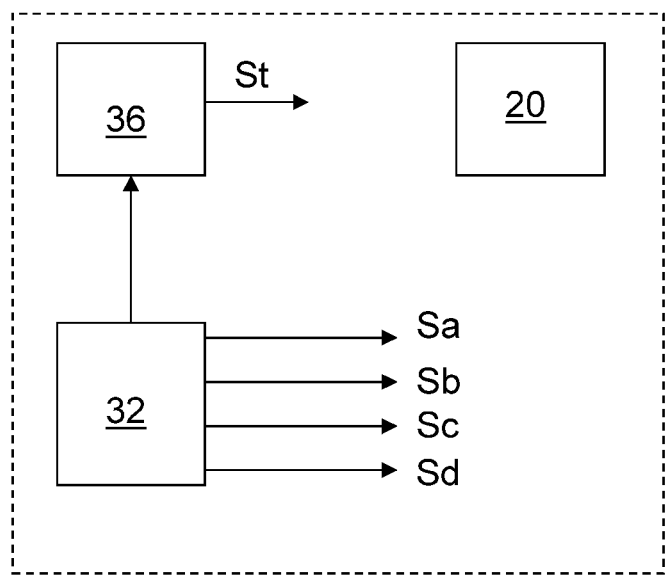
FIG. 14 shows an embodiment of the electronic device according to the first aspect wherein the touch simulation circuitry is used to detect a state of the electronic device.

According to another approach, the touch simulation facility is used to detect whether the electronic device is in the opened or the closed state. The calibration controller 32 may for example activate a touch simulation element and the state identification device 36 may detect whether the activation of the touch simulation element is sensed by the touch sensitive panel or not. This is illustrated in FIG. 14.

It is even possible to use the touch simulation facility to determine which one of a set of intermediary states is prevailing.

Figure 15A:
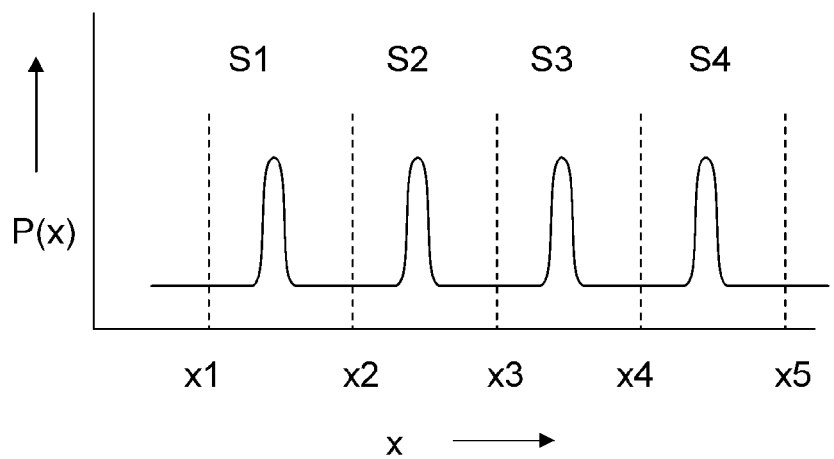
FIG. 15A shows a probability density function for a sensed position, in an electronic device having a discrete set of states.

This is illustrated with FIGS. 15A and B. FIG. 15A shows the probability density function that a value X is generated by the preprocessing unit 21 in a stable state of the electronic device by a touch simulation element, e.g. element 34a of the touch simulation facility. Therein X is the distance to the position where a touch is sensed in the direction from part 4 to part 2 of the device. The electronic device has a stable closed state S1, wherein the distance is minimal and a stable opened state wherein the distance is maximal. Furthermore, the electronic device has stable intermediate states S2, S3.

Each of the stable states S1, S2, S3, S4 corresponds to a real distance XR. If the difference XR between mutually subsequent states is larger than the error introduced by the preprocessing unit 21, the value X is a reliable indicator for the state of the device. This is illustrated in FIG. 15A. Accordingly, an identification of the state is possible with the arrangement shown in FIG. 15B. Therein the state-estimator 36 determines the prevailing state by the following rules.

If $x1 < X \leq x2$ then St=S1
If $x2 < X \leq x3$ then St=S2
If $x3 < X \leq x4$ then St=S3
If $x4 < X \leq x5$ then St=S4
Else, an error condition is signaled.

The state estimator 36 further generates the real distance XR for the position of the touch simulation panel 10 where the touch is simulated corresponding to the identified state St.

The generated real distance XR and the sensed distance X are used to calculate a position error ΔX that is used for calibration by post-processing unit 22 (shown in FIG. 7).

Figure 15B:
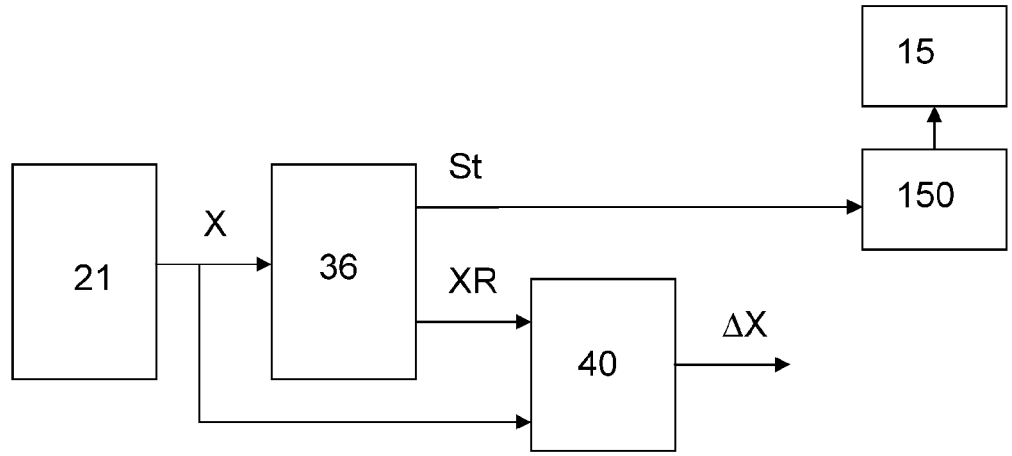
FIG. 15B shows a further embodiment of the electronic device according to the first aspect wherein the touch simulation circuitry is used to detect a state of the electronic device, and to control a display generator.

As indicated in FIG. 15B the signal St issued by state estimator 36 may be used by a display driver 150 to drive the display 15 according to the detected state.

In this way, the display driver 150 may adapt the content to be displayed and/or adapt the scale with which the content is displayed to the size of the display 15 in the prevailing state of the device. The number of states in which the electronic device can be arranged by the user may be two or more. The electronic device may for example have a closed state, wherein still a portion of the display is visible.

Figures 16A, 16B:
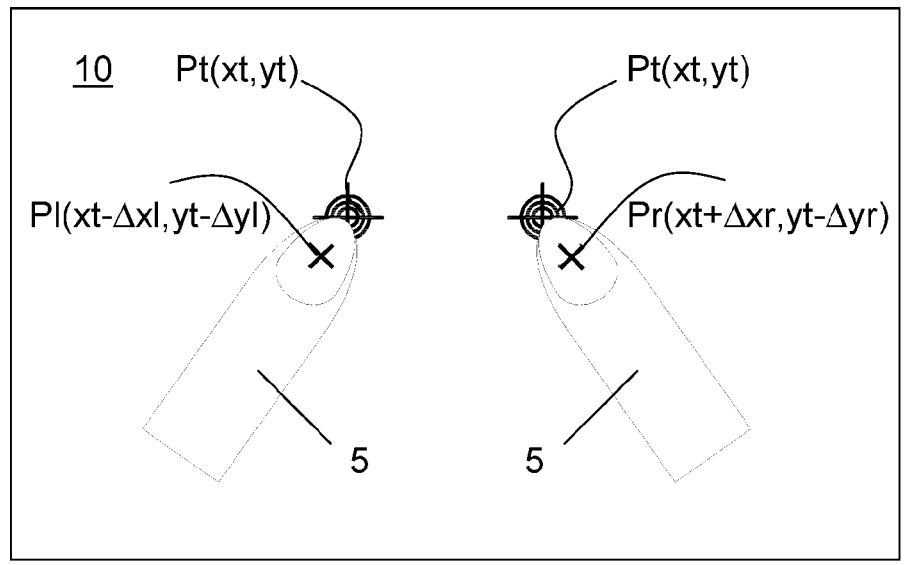
FIG. 16A, 16B respectively show a deviation in de touched position of a touch sensitive panel in the case of a left-handed and a right-handed user.

As indicated in FIG. 16A, 16B the target position Pt pointed at by a users finger 5 will in practice not correspond to the position on the touch sensitive panel 10 where a touch event is generated by the user. FIG. 16A shows the situation where a left-handed user points at target position Pt but touches the panel 10 at position Pl, which is a position below (−Δ/yl) and to the left (−Δxl) of the target position. Similarly, the right-handed user touches the panel 10 at a position Pr deviating from the target position Pt by a deviation (+Δxr, −Δyr).

Figure 16C:
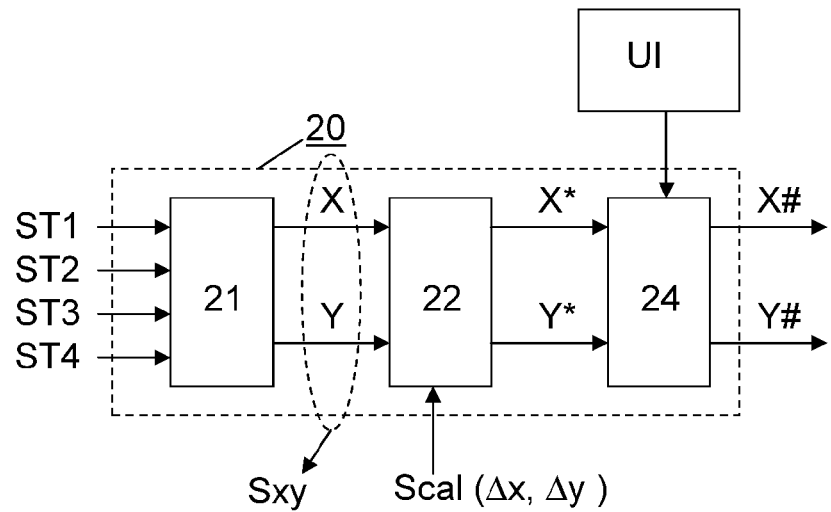
FIG. 16C shows a touch sense circuit for an electronic device according to the first aspect including a dexterity compensation facility.

To compensate for these deviations the electronic device 1 may have a dexterity compensation unit 24 as shown in FIG. 16C. In an embodiment, the dexterity compensation unit 24 inquires for the dexterity of the user via a user interface 10 and depending on the information provided in response by the user, the dexterity compensation unit 24 calculates compensated coordinates (X#, Y#) as (X*+Δxl, Y*+Δyl) for the left-handed user or as (X*−Δxr, Y*+Δyr). The values Δxl, Δyl, Δxr, Δyr may be predetermined average values. In another embodiment, the user interface UI may demand the user to point to a specified target point on the display. The deviation (Δx, Δy) between the specified target point Pt and the point indicated by the user can then be used by the dexterity compensation unit 24 for calculating the corrected coordinates (X#,Y#).

Figure 17:
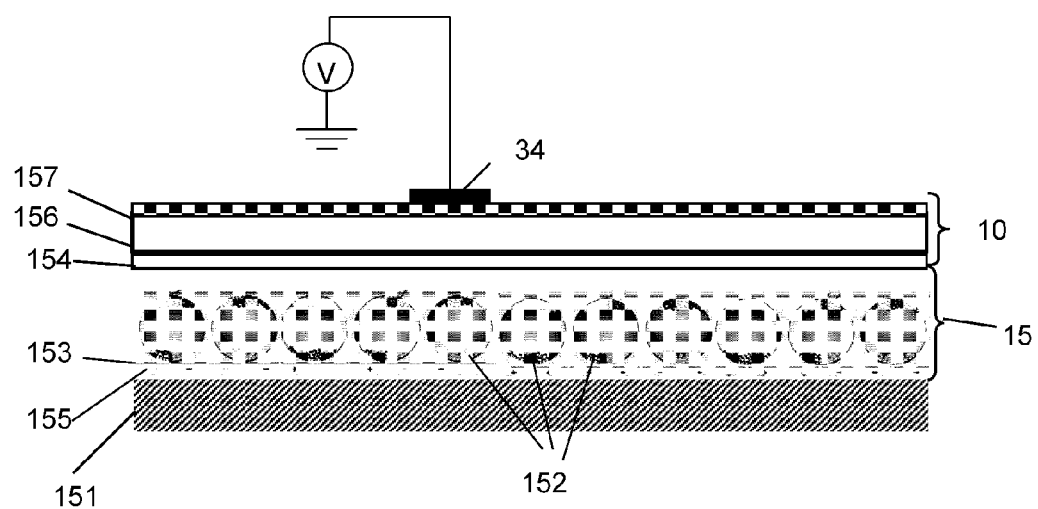
FIG. 17 shows an integrated display panel and touch sensitive panel for use in a display system according to the second aspect of the invention.

FIG. 17 shows an embodiment of touch sensitive panel 10 integrated in a display device 15. The display device 15 and the touch sensitive panel are arranged on a flexible substrate 151, e.g. a PET (Poly Ethylene Terephthalate) or PEN (Poly Ethylene Naphthalate) layer having a thickness of less than 50 μm, preferably less than 25 μm and more preferably less than 15 μm, e.g. 12.5 μm.

The display device 15 is responsive to output signals $S_{out}$ from a display driver 150, see e.g. FIG. 15B. In the embodiment shown, the display device 15 is reflection based. This is advantageous in that the display is well visible in sunlight. In particular, the display device 15 comprises a layer of multistable elements, here electrophoretic elements 152. The electrophoretic elements 152 are controlled by individual electrodes 153 and a common electrode 154. The individual electrodes 153 are driven by thin film transistors in a TFT layer 155. An electrophoretic display has the advantage that power is only required to change the image content, and not to maintain the image. Electrophoretic materials are for example provided by E Ink Corporation or SiPix Imaging, Inc. These materials are relatively insensitive for UV-radiation, which allows for a broader range of manufacturing methods when integrating the display with other functional layers. Another technology using bistable elements is based on liquid-behavior-powder as provided by Bridgestone Corporation, as described in a "Development of Novel Bistable Display using Titania Composite" by Hiroaki Wada et al. downloaded from http://www.scientific.net.

Nevertheless, the display layer may be based on another display technology, e.g. CTLC (Cholesteric Texture Liquid Crystal) or BiNem™ (Bistable Nematic) or an emissive technology. For example, the display layer may comprise other active display elements like OLEDs. This has the advantage that the display is also visible in dark environments.

The panel further comprises a touch sensitive structure 10 that shares the comprising at least a first layer with an electrically conductive structure. In this embodiment, the first layer is the common electrode 154, that also forms part of the display panel 15. The touch sensitive structure 10 also comprises an insulating layer 156. In the embodiment, a further layer 157 is shown, e.g. an optically functional, mechanically protective or chemical protective coating, like anti-reflection, anti-glare, hard-coat, anti-smudge, UV-protection, protection against chemicals, anti-vapor etc.

Figure 18:
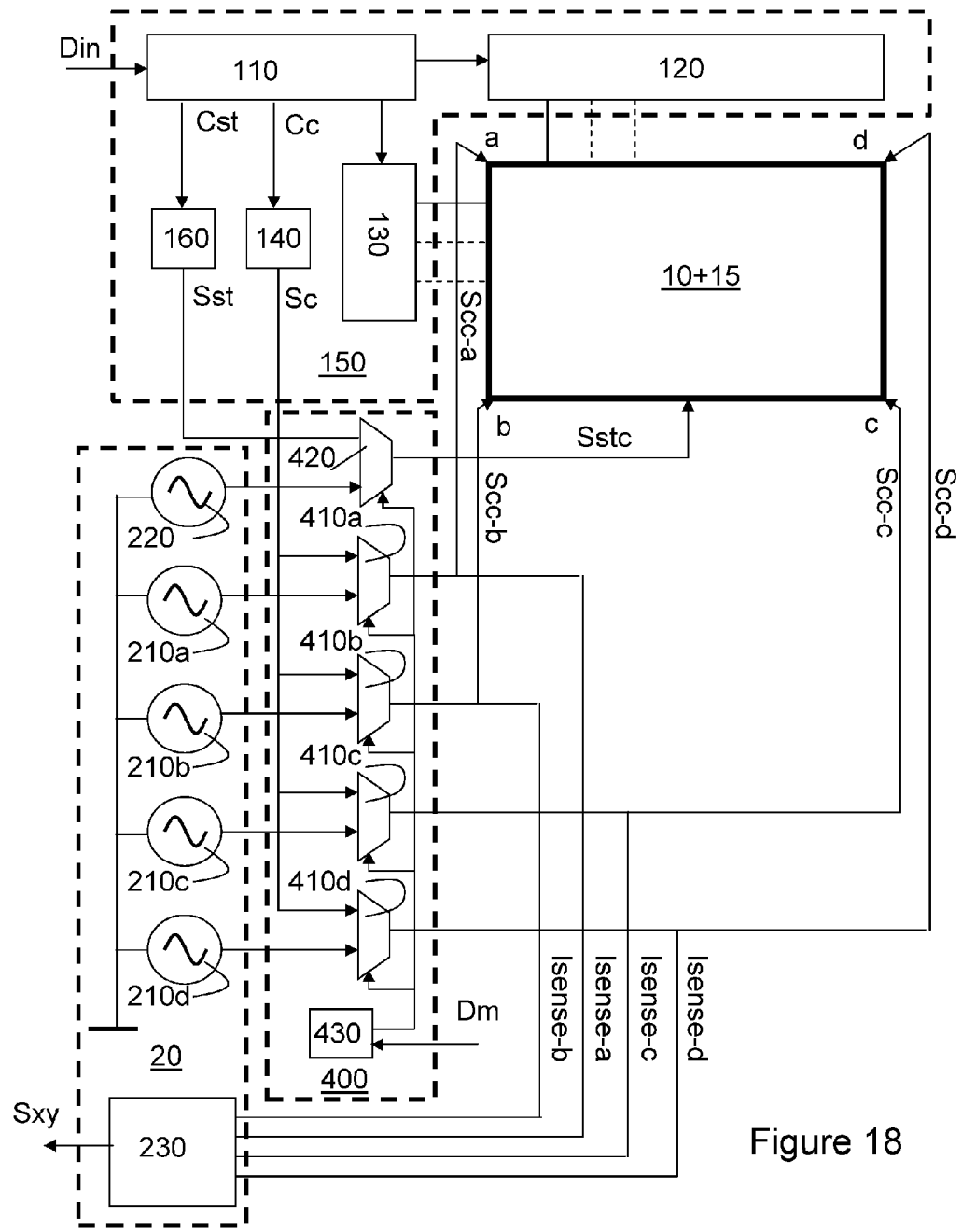
FIG. 18 shows an embodiment of a display system comprising the integrated display panel and the touch sensitive panel and further comprising an electronic circuitry coupled thereto.

The combined display panel 15 and touch sensitive panel 10 are coupled to a circuit as illustrated in FIG. 18 and as described in more detail also in the earlier filed U.S. application Ser. No. 12/976,590.

In the configuration shown in FIG. 18, the display driver 150 comprises a controller 110. The display driver 150 further comprises a column driver 120, a row driver 130, a common driver 140 and a storage driver 160 that are controlled by the controller 110. In an operational mode, the controller 110 receives data input signals Din from an application, which may interact with a user interface. The application for example receives the data input signals from a data memory. In response to the data input signals, the controller 110 provides respective control signals Ccl, Crw, Cc and Cst for the column driver 120, the row driver 130, the common driver 140 and the storage driver 160. The column driver 120 generates column signals Scl1, . . . , n in response to control signal Ccl. The row driver 130 generates row signals Srw1, . . . , m in response to control signal Crw. The common driver 140 generates a common signal Sc in response to control signal Cc and the storage driver 160 generates storage signal Sst in response to control signal Cst.

In the embodiment, the sensor circuit 20 has respective first signal generators 210a, 210b, 210c, 210d for providing a respective probe signal to a first input of a respective combination element 410a, 410b, 410c, 410d. Each of the combination elements has a second input coupled to the common electrode driver 140 for providing the signal Sc. The combination elements 410a, 410b, 410c, 410d provide respective probe-signals Vprobe-a, . . . Vprobe-d at the respective corners of the common electrode 154. The sensor circuit 20 has a further signal generator 220 for generating a shield signal Vshield that is provided to a further combination element 420 for providing at least one output control signal Sstc for the active matrix layer from the at least one of the input control signals Sst and the shield signal Vshield. The combination elements 410a, 410b, 410c, 410d and 420 are for example multiplexers or adders. In this case, the combination elements 410a, 410b, 410c, 410d and 420 are multiplexers that are controlled by mode setting unit 430 responsive to a mode control signal Dm. The detection module 230 generates the touch signal Sxy in response to output signals Isense-a, Isense-b, Isense-c, Isense-d received from respective corners a-d of the common electrode 154, as shown schematically in FIG. 4 and FIG. 8A.

A touch simulation element 34, in the form of an electrically conductive element, is arranged at the surface of the touch sensitive panel 10, as would be the case in a closed state of a electronic device according to the invention. The touch simulation element 34 is connected to a controllable voltage source V. By setting the controllable voltage to a ground level, a touch event is generated at the location where the touch simulation element 34 is arranged against the screen. A touch event in the closed state of the electronic device is avoided if a voltage is applied equal to the voltage used for probe signals Vprobe-a, . . . Vprobe-d.

In the claims, the word "comprising" does not exclude other elements or steps, and the indefinite article "a" or "an" does not exclude a plurality. A single component or other unit may fulfill the functions of several items recited in the claims. The mere fact that certain measures are recited in mutually different claims does not indicate that a combination of these measures cannot be used to advantage. Any reference signs in the claims should not be construed as limiting the scope.

What is claimed is:

1. An electronic device having a first and a second part coupled to each other, said electronic device being arrangeable during use into one of at least an opened and a closed state by the first and the second parts, said electronic device comprising:
    a touch sensitive panel connected to the first and the second part;
    a sensor circuit for generating a touch signal indicative for a sensed position where a touch of the touch sensitive panel is detected;
    a touch simulation apparatus comprising at least one touch simulation element disposed on a rear surface of the touch sensitive panel, arranged such that when the electronic device is in the closed state, the touch simulation element is located opposite to the front surface of said touch sensitive panel and mechanically contacts said touch sensitive panel at at least one reference position of said touch sensitive panel to evoke a calibration touch signal; and
    a comparator for comparing the calibration touch signal with a reference value corresponding to the reference position of the at least one touch simulation element and for generating a correction signal (Scal) for adjusting a setting of the sensor circuit for compensation of a difference detected between the reference position of said touch sensitive panel where the touch signal is evoked and the sensed position indicated by the calibration touch signal,
    wherein in the closed state of the electronic device, the touch sensitive panel is stored in a rolled state in the first part.

2. The electronic device as claimed in claim 1, wherein the at least one touch simulation element is a protrusion that mechanically simulates a touch event in the closed state.

3. The electronic device as claimed in claim 1, wherein the at least one touch simulation element comprises an actuator for mechanically simulating a touch event in the closed state.

4. The electronic device as claimed in claim 1, wherein the at least one touch simulation element is an electrically conducting element that electrically simulates a touch event in the closed state.

5. The electronic device as claimed in claim 1, wherein the touch simulation apparatus is arranged to detect whether the electronic device is in the opened or the closed state.

6. The electronic device as claimed in claim 1, further comprising a dexterity compensation unit, for compensating a deviation in an indicated position dependent on a dexterity of the user.

7. The electronic device as claimed in claim 1, wherein said at least one touch simulation element is arranged in or on a lateral portion in the touch sensitive panel, and wherein said at least one touch simulation element in the closed state of the electronic device is arranged opposite another lateral portion of said touch sensitive panel.

8. A display system comprising an electronic device as claimed in claim 1 and further comprising at least one display panel.

9. The electronic device as claimed in claim 8, wherein the touch sensitive panel is integrated with the display panel.

10. The electronic device as claimed in claim 8, arrangeable during use in one of a plurality of states, wherein the touch simulation apparatus comprises a state estimation apparatus for detecting said arranged one of the states, and for providing a status signal indicative of said detected state, the display system comprising a display driver that drives the display panel according to the detected state.

* * * * *